United States Patent [19]

Eitz et al.

[11] Patent Number: 5,627,593

[45] Date of Patent: May 6, 1997

[54] METHOD FOR PROCESSING TELETEXT DATA PRESENT IN A TELEVISION SIGNAL

[75] Inventors: Gerhard Eitz, Poing; Sandor Gyarmati, Villingen-Schwenningen, both of Germany

[73] Assignee: Deutsche Thomson Brandt GmbH, Villingen-Schwenningen, Germany

[21] Appl. No.: 361,324

[22] Filed: Dec. 21, 1994

[30] Foreign Application Priority Data

Dec. 22, 1993 [DE] Germany .................. 43 43 951.9

[51] Int. Cl.$^6$ ................................. H04N 7/087
[52] U.S. Cl. .............................. 348/466; 348/468
[58] Field of Search ................... 348/465, 468, 348/478, 466, 563, 725; H04N 7/087

[56] References Cited

U.S. PATENT DOCUMENTS

| | | | |
|---|---|---|---|
| 4,577,227 | 3/1986 | Gurumurthy | 348/468 |
| 4,593,374 | 6/1986 | Gurumurthy | 348/468 |
| 4,963,968 | 10/1990 | Bugg et al. | 348/468 |
| 4,992,871 | 2/1991 | Bensch et al. | 348/468 |

FOREIGN PATENT DOCUMENTS

| | | |
|---|---|---|
| 0460759 | 12/1991 | European Pat. Off. . |
| 094013106 | 6/1994 | WIPO . |

*Primary Examiner*—Victor R. Kostak
*Attorney, Agent, or Firm*—Joseph S. Tripoli; Peter M. Emanuel; Frederick A. Wein

[57] ABSTRACT

In order to achieve a greater degree of security in the decoder for the control frame of teletext pages, the control frame is initially selected and decoded from the data stream by means of a bit by bit comparison with a frame word. Thereby, the following steps are carried out in dependence on the number of coincidences occurring during the bit by bit comparison with the frame word:

a) if, during the bit by bit comparison, eight coincidences are detected, the control frame is considered to have been identified and the counter is reset;

b) if less than eight coincidences are detected, it is determined whether a particular number ("444") or a multiple of this number ("n 444") has been reached on the basis of the count-state of the clock pulse counter, whereby, in the event that this number has been reached, the control frame is considered to have been identified and the counter is reset.

9 Claims, 2 Drawing Sheets

METHOD FOR PROCESSING TELETEXT DATA PRESENT IN A TELEVISION SIGNAL

The teletext pages are transmitted in the blanking intervals of the television signal. In each case, a line of a page is transmitted in a television line together with a control frame used for synchronising purposes and an address frame used for the addressing of the useful items of data which are finally displayed as readable items of information on the screen.

A method of this type is known from the publication "The World System Teletext, Technical Specification", Department of Trade and Industry, Information Technology Division, 29 Bressenden Place, GB- London SW1).

For reasons of compatibility, the normal Level-1 pages and the supplementary pages for higher levels, such as are known from DE 39 14 697, have the same control frame and the same address frame which is protected by the Hamming code 8/4.

A 1 bit error in a word of the address frame can be detected and corrected in each case by evaluating the Hamming code. Furthermore, in order to achieve a greater degree of security in the decoding process for the address frame of a teletext page without using additional error protecting measures, it is known (P 42 39 351) to make a prediction of the address frame for the succeeding teletext line from the decoded and, if necessary, error corrected address frame of a teletext line and, upon a deviation of two or more units of information of a word, to use the predicted address frame instead of the received address frame for the purposes of addressing the data stream for the teletext line concerned.

Consequently, if there is a double error in the address frame—in the line address for example—it is possible for the decoder to recreate the correct line address and to associate all of the appertaining useful items of data with the line concerned.

If, on the other hand, double errors occur in the useful items of data, for example in the supplementary items of data for higher levels, then a correction can be effected by the decoder by virtue of the items of error protecting information that are transmitted simultaneously.

However, the pre-requisite for the correcting measures at the decoder end, which have been mentioned above, is the positive identification of the control frame. This control frame is composed of a particular signal sequence for the generation of the data clock rate and of a defined code having a length of eight bits, the so-called frame word, for synchronising the bytes.

The incoming items of data are compared bit by bit with the frame word for the purposes of synchronising the bytes. A correct synchronisation of the bytes is only possible if eight or seven coincidences are detected by the decoder i.e. the frame word is not subject to interference or is only subject to one error.

However, a second error in the frame word leads to the decoder not recognising the control frame; consequently, all of the following, useful item of data in this television line are lost.

Thus, the decoding of the control frame provided for in the Teletext-Specification turns out to be a bottle-neck which negates the error protection measures for the address decoding process and for the supplementary items of data that are provided for in the said publications.

A reduction of the threshold for the number of coincidences when comparing the frame word is not advisable since the frame word could no longer be relied upon in this case.

Furthermore, for reasons of compatibility, a removal of the bottle-neck by an alteration of the control frame does not come into consideration. Here, there is the fact that an improved error protection of the control frame requires a correspondingly increased redundancy which reduces the available useful data rate or further increases the waiting time for a wanted teletext page.

In addition, special circuit measures in the latest generation of decoders do not provide any assistance with the problem: during poor reception conditions, many lines of a page may not be recognised because of an incorrect decoding of the control frame and are not then portrayed even though the remaining lines of the page concerned are often almost error free.

As against this, the object of the invention consists in achieving a greater degree of security for the decoding of the control free of teletext pages, in particular in the event of double errors, in a method of the type mentioned hereinabove without using any further error protection measures.

Advantageous embodiments and developments are apparent from the appendant claims.

In the method in accordance with the invention, the bottle-neck occurring when the control frame is subject to interference is removed in that, in addition to the bit by bit comparison between the incoming items of data and the frame word for the identification of the control frame, the clock rate of the items of teletext data from the last television line is continued and evaluated by means of a counter.

BRIEF DESCRIPTION OF THE DRAWINGS

The invention will be explained in more detail with the help of the drawings. Therein

DESCRIPTION OF THE PREFERRED EMBODIMENT

Figure 1:
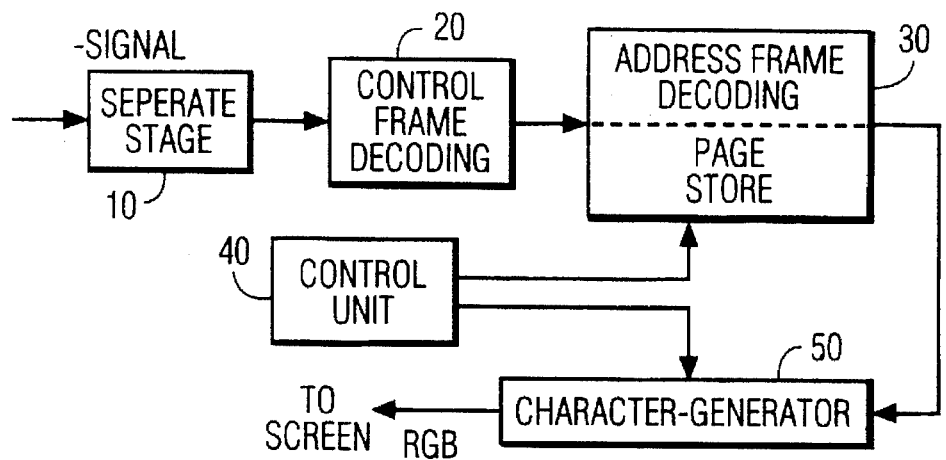
FIG. 1 shows a schematic illustration of a teletext decoder having control frame decoding means.

The teletext decoder illustrated merely schematically in FIG. 1 and illustrating only the details required in regard to the understanding of the invention has a data separating stage 10 which separates from the incoming television signal the teletext data stream contained therein. The clock rate of the data and an item of control frame information, with which the byte by byte compilation of the succeeding items of data of the teletext data stream is possible, are obtained from the separated teletext data stream in a control frame decoding means 20 which will be explained in detail hereinafter with the help of FIG. 2. The items of teletext data, which have been assembled together byte by byte, are compiled line by line into teletext pages, in the succeeding stage 30, in accordance with the items of information from the address frame and are buffer stored in a page store, Upon demand by the user, the buffer stored teletext pages are read-out of the page store 30 under the control of a control unit 40 into a character generator 50 which converts the teletext pages into an R-G-B image signal for display on a screen.

Figure 2:
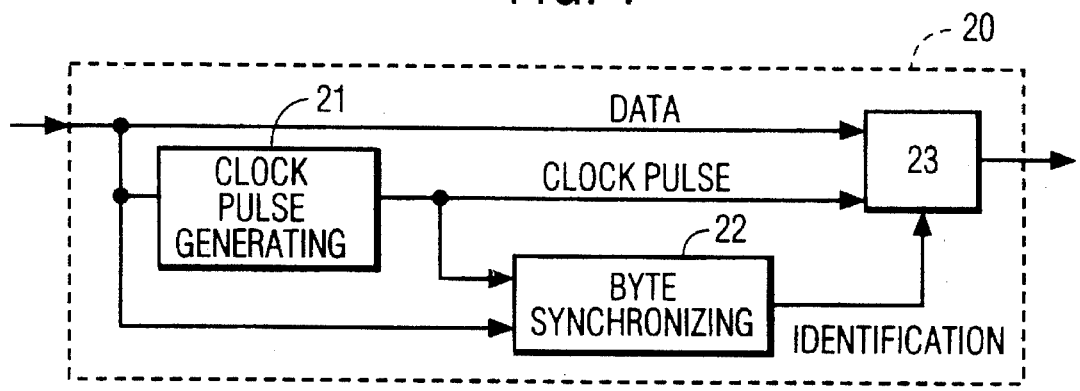
FIG. 2 a schematic illustration of the control frame decoding means for the teletext decoder in accordance with FIG. 1.

As ensues from the block circuit diagram of an embodiment of a control frame decoding means in FIG. 2, the clock rate of the items of teletext data is obtained from the incoming teletext data stream by means of a clock pulse generating stage 21 and clock pulses are continuously generated with the necessary degree of precision until the next items of data arrive.

The clock pulses and the items of data are fed to the byte synchronising means 22 according to the invention, which means emits an identification signal to the stage 23 when it recognises the frame word. The stage 23, to which moreover the item of data and the clock pulses are also supplied, divides the data stream into bytes in accordance with the identification signal and makes the bytes available to the address frame decoding means 30 (FIG. 1).

Figure 3:
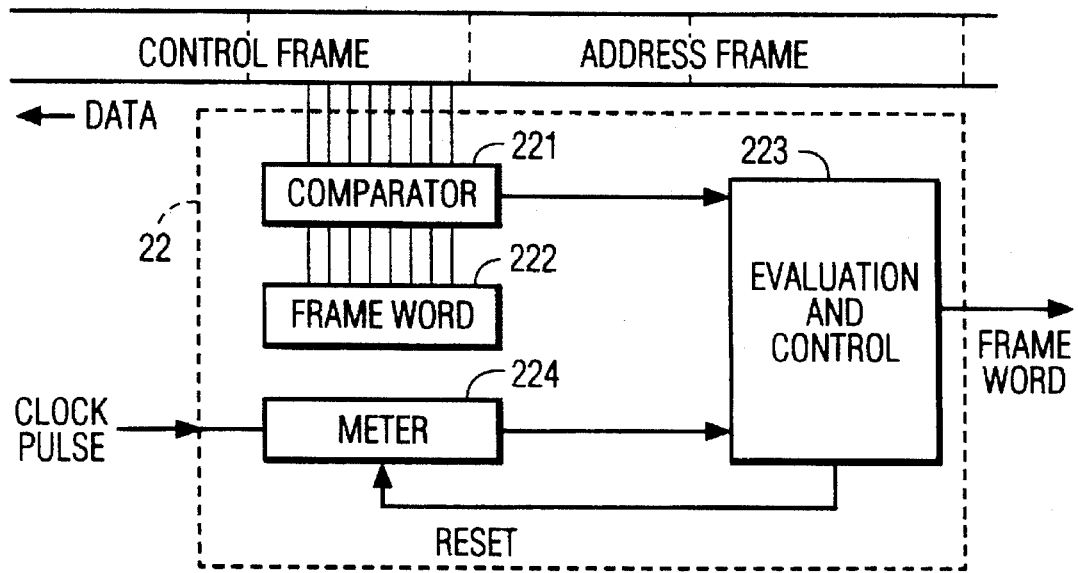
FIG. 3 a schematic illustration of an embodiment of a control frame decoding means in accordance with the invention.

FIG. 3 shows the basic construction of the byte synchronising means 22 in accordance with the invention. The incoming items of data are compared bit by bit by the comparator 221 with the stage 222 which contains the frame word that is to be elicited as a fixed storage value. The frame word "27 hex" has been agreed for the teletext service in the "World System Teletext" specification. One can conceive of further services having other frame words e.g. a service for a role-newspaper. The number of coincidences detected in each case is conveyed from the comparator 221 to the evaluation and control stage 223. The frame word is considered to have been positively identified as soon as eight coincidences have been signalled; a corresponding identification signal is emitted to the stage 23 of FIG. 2 and a counter 224, to which the clock pulses from the clock pulse generating means 21 are supplied, is reset.

If, on the other hand, less than eight coincidences are signalled, the counter state of the counter 224 is additionally evaluated by the stage 223. If the counter state amounts to 444 or a multiple of this number, then the frame word is also recognised by the evaluation and control stage 223 if it is subject to one or two (or even more) errors. In this case too, the identification signal is emitted and the counter 224 is reset.

To aid understanding of the process, the following should be noted:

The clock rate for teletext amounts to the 444th multiple of the nominal television line frequency of 15.625 kHz. The invention is thus based on the consideration that a television line having a frame word and items of teletext data can be expected after n 444 clock pulses for n=1, 2, 3 . . . , 298, 299 . . . .

In order to balance out marginally different clock frequencies between the transmitter and decoder, it can also be expedient to permit counter states of n 444±1 clock pulses to be used for an evaluation, in particular, when the period of one field exists between the individual data streams i.e. n is greater than 297.

In order to limit the costs at the decoder end, it may be expedient furthermore to only count the clock pulses of a single blanking interval in each case. Thereby, one accepts that in each case the first teletext line in a field can only be detected in the event of an error free frame word.

It is expedient, in particular for teletext programmes which function in the so-called "parallel mode", in which the items of teletext data of certain lines can be generated by different transmitters, to store the individual counter states between the individual teletext lines in the evaluation and control stage 223 (learn mode) in order to use them later for the identification of frame words which are subject to interference in dependence on the line concerned.

The previously described identification of the control frame for a doubly interfered with frame word is shown in more detail in FIG. 4 with the help of an example.

Figure 4A:
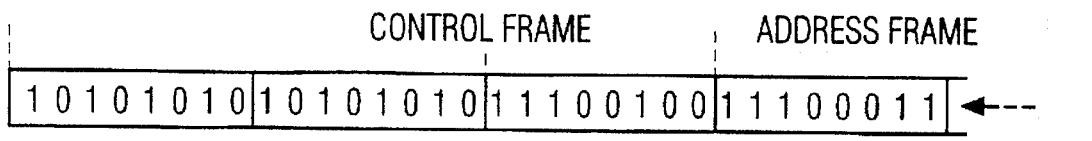
FIG. 4 an example of a data sequence in a control frame which is subject to interference and of a data sequence which is subject to more than one error, wherein the data sequence which is subject to interference is subjected to a comparison with the wanted frame word.

FIG. 4a shows a data sequence of the control frame which is not subject to interference and which consists of a clock pulse component and the frame word. A part of the address frame is appended to the control frame.

Figure 4B:
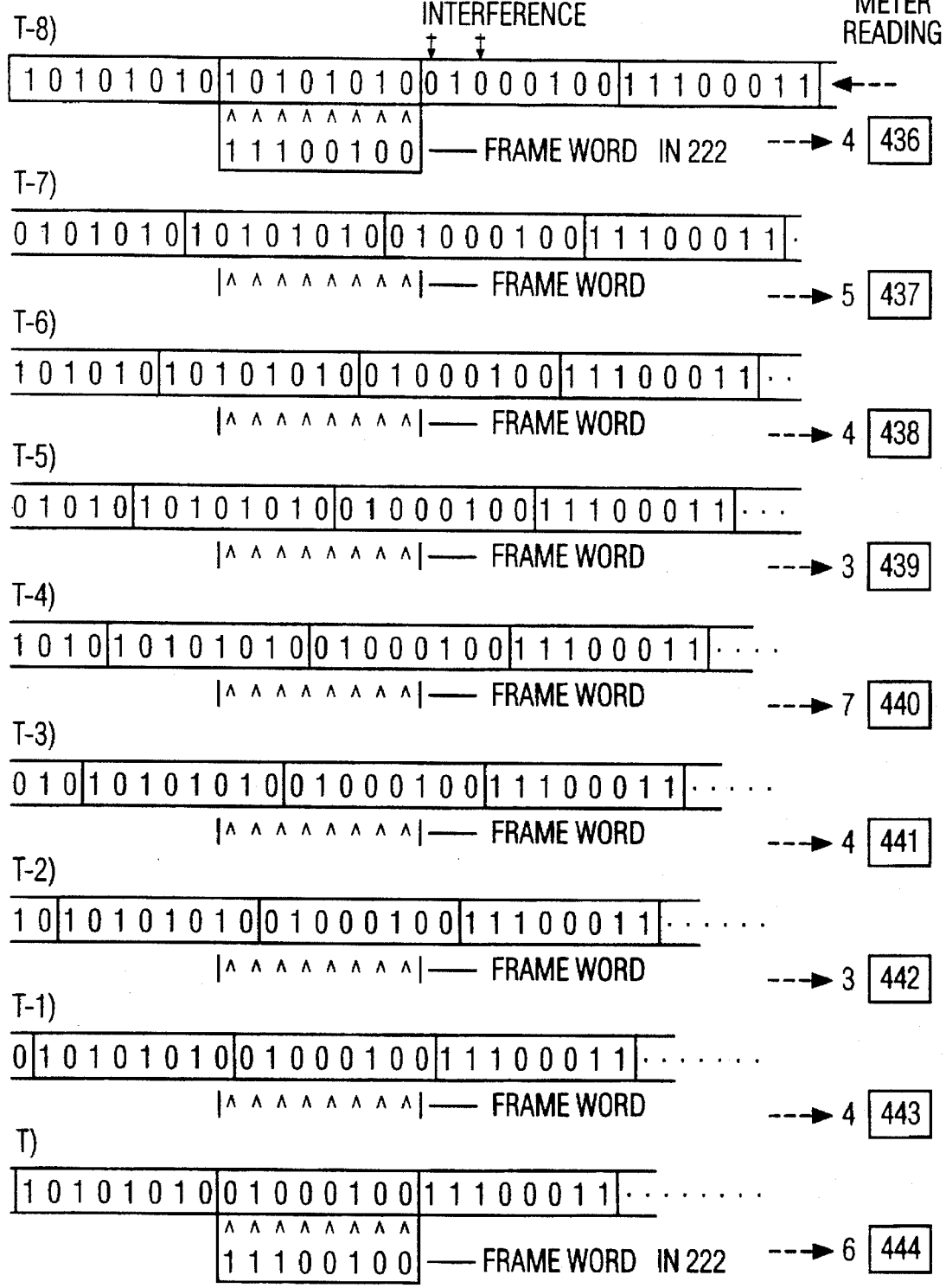

FIG. 4b shows the structure of a data stream having a frame word that is subject to two errors, for the clock pulses T-8), T-7), . . . , T), wherein T) is the time point that is to be detected for the frame word structure that has just occurred. At the clock pulse T-8), the bit sequence "10101010" is compared with the stored frame word "11100100" that is to be identified and four coincidences (at the positions "1__11__1") are detected. The clock pulse counter stands at "436" (444–8 clock pulses). At the following clock pulse T-7), the number of coincidences increases to five (at the positions "__1__111") and the state of the counter is "437".

At the clock pulse T-4), the data sequence already present at seven positions is similar to the frame word that is to be detected. A conventional decoder functioning in accordance with the specification is misled by such a data sequence and incorrectly signals four clock pulses too soon that the frame word has been identified.

A decoder constructed according to the method in accordance with the invention on the other hand always correctly identifies, at the clock pulse T), that a frame word is present, from the number of six coincidences and from the counter state "444". It thereupon emits the identification signal.

We claim:

1. Method of processing teletext data present in a television signal, comprising:

separating out a data stream from the television signal, gathering together the data appertaining to a respective teletext page as teletext rows;

storing the thus compiled teletext pages in a buffer stored, selecting and decoding a control frame from a data stream by means of a bit by bit comparison with a frame word, continuing and counting the clock rate of the items of teletext data of a last television line when decoding the control frame, the following steps being carried out in dependence on coincidences occurring during the bit by bit comparison with the frame word:

a) if, during the bit by bit comparison, eight coincidences are detected, the control frame is considered to have been identified and the counter is reset; and b) if less than eight coincidences are detected, it is determined whether a particular number or a multiple of the particular number has been reached on the basis of the count-state of a clock pulse counter, whereby, in the event that this number has been reached, the control frame is considered to have been identified and the clock pulse counter is reset.

2. Method in accordance with claim 1, wherein the control frame is also considered to have been identified for counter states that only differ by a predetermined margin from the particular number or the multiple of the particular number.

3. Method in accordance With claim 2, wherein the values of n=1 to 15 inclusive.

4. Method in accordance with claim 1 wherein only the clock pulses from a single blanking interval are counted whereby the clock rate is counted as from the first control frame that is identified as being error-free.

5. Method of processing teletext data present in a television signal, comprising:

separating out a data stream from the television signal, gathering together the data appertaining to a respective teletext page as teletext rows;

storing the thus compiled teletext pages in a buffer stored, selecting and decoding a control frame from a data stream by means of a bit by bit comparison with a frame word, continuing and counting the clock rate of the items of teletext data of a last television line when decoding the control frame, the following steps being carried out in dependence on coincidences occurring during the bit by bit comparison with the frame word:
   a) if, during the bit by bit comparison, eight coincidences are detected, the control frame is considered to have been identified and the counter is reset;
   b) if less than eight coincidences are detected, it is determined whether a particular number or a multiple of the particular number has been reached on the basis of the count-state of a clock pulse counter, whereby, in the event that this number has been reached, the control frame is considered to have been identified and the clock pulse counter is reset, and in a learning mode, detecting and storing the instantaneous states of the counter, between the individual television lines that are occupied by items of teletext data, and depending upon the line concerned, using the stored counter states for the detection of frame words which have been subjected to interference.

6. Method in accordance with claim 2, wherein only the clock pulses from a single blanking interval are counted whereby the clock rate is counted as from the first control frame that is identified as being error-free.

7. Method in accordance with claim 3, wherein only the clock pulses from a single blanking interval are counted whereby the clock rate is counted as from the first control frame that is identified as being error-free.

8. Method in accordance with claim 2, wherein in a learning mode, detecting and storing the instantaneous states of the counter, between the individual television lines that are occupied by items of teletext data, depending upon the line concerned, using the stored counter states for the detection of frame words which have been subjected to interference.

9. Method in accordance with claim 3, wherein in a learning mode, detecting and storing the instantaneous states of the counter, between the individual television lines that are occupied by items of teletext data, depending upon the line concerned, using the stored counter states for the detection of frame words which have been subjected to interference.

* * * * *